G. VORDERMARK.
RESILIENT VEHICLE WHEEL.
APPLICATION FILED DEC. 20, 1920.
1,420,393.
Patented June 20, 1922.
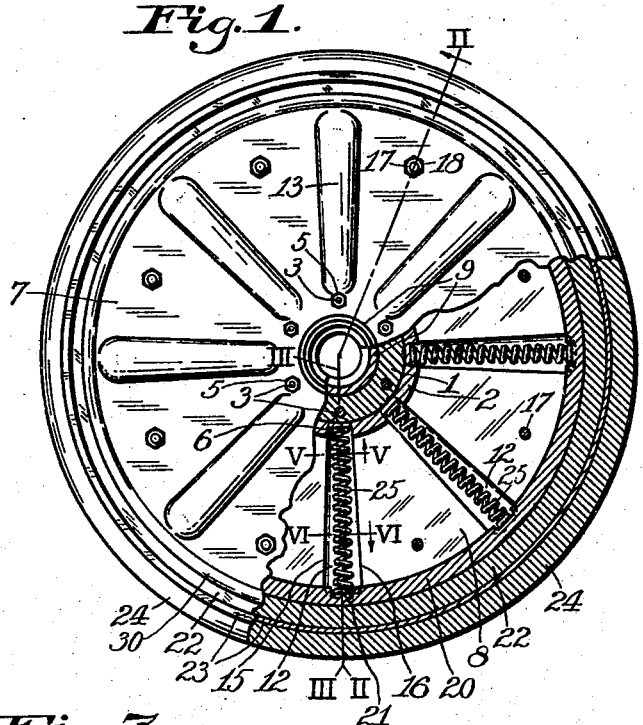
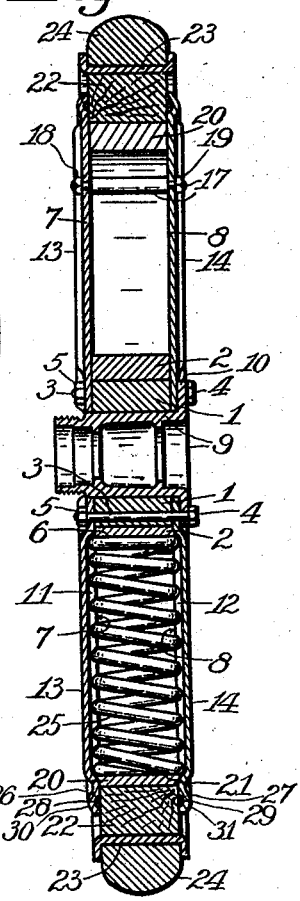
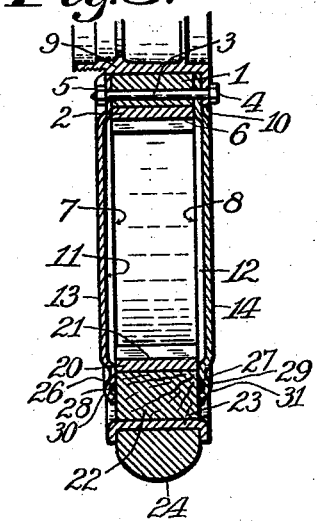
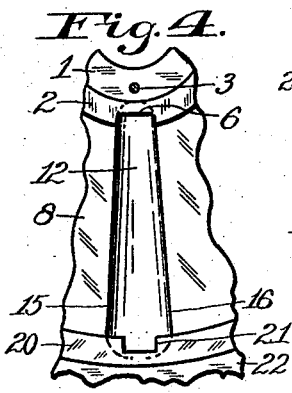
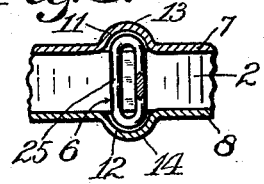
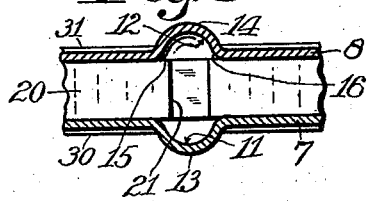
WITNESS:
R. F. Buckley.
M. D. Steele.
INVENTOR:
George Vordermark,
BY E. D. Silvius,
ATTORNEY.

UNITED STATES PATENT OFFICE.

GEORGE VORDERMARK, OF INDIANAPOLIS, INDIANA.

RESILIENT VEHICLE WHEEL.

1,420,393.  Specification of Letters Patent.  Patented June 20, 1922.

Application filed December 20, 1920. Serial No. 431,913.

*To all whom it may concern:*

Be it known that I, GEORGE VORDERMARK, a citizen of the United States, residing at Indianapolis, in the county of Marion and State of Indiana, have invented a new and useful Resilient Vehicle Wheel, of which the following is a specification, reference being had to the accompanying drawings, and to the letters and figures of reference marked thereon.

This invention relates to the type of vehicle wheel that is designed for automobiles and is especially adapted for motor trucks, the invention having reference more particularly to a vehicle wheel of the type that has resilient connection between the rim and the hub of the wheel.

An object of the invention is to provide a resilient wheel for road vehicles which shall have few and simple parts designed to be produced at small cost and be strong and not liable to fracture or damage, especially when overloaded.

Another object is to provide an improved vehicle wheel which shall have longitudinally resilient spokes, and disks so constructed and arranged as to constitute driving connections between the hub and the rim of the wheel in a simple and reliable manner.

A further object is to provide a resilient vehicle wheel in which spring-spokes may be used in a novel manner to render the wheel resilient and also constitute devices enabling a driving axle to drive the rim of the wheel, and which shall be so constructed that the wheel will not be disabled but may be operated in emergency in case of fracture of the spring-spokes.

A still further object is to provide a resilient vehicle wheel which shall be so constructed as to permit ready repairs in case of unavoidable breakage by accident or overloading; which wheel shall be durable and economical in use.

With the above-mentioned and other objects in view, the invention consists in a vehicle wheel having novel resilient spokes, and disks constituting supporting and driving means between the hub and the rim portions of the wheel; and, the invention consists also further in the novel parts and features, and in the combinations and arrangements thereof, as hereinafter particularly described and further defined in the accompanying claims.

Referring to the drawings,—Figure 1 is a front view of the improved wheel partially in section; Fig. 2 is a section of the wheel on an enlarged scale approximately on the line II—II in Fig. 1; Fig. 3 is a fragmentary section approximately on the line III—III in Fig. 1 on an enlarged scale, the resilient spoke being omitted; Fig. 4 is a fragmentary detail showing portions of the inner side of the wheel; Fig. 5 is a fragmentary section approximately on the line V—V in Fig. 1; and, Fig. 6 is a fragmentary section approximately on the line VI—VI in Fig. 1.

Similar reference characters in the various figures of the drawings indicate corresponding elements or features of construction herein referred to in detail.

A practical embodiment of the invention, as preferably constructed, comprises a suitable hub member which may be advantageously composed of an annular inner part 1 and an outer part 2 embracing the inner part. The inner part may be non-metallic, such as wood or vulcanized fiber to deaden sound, and the outer part should preferably be composed of metal. The hub member is provided with a suitable number of bolts 3 arranged in a circle, each bolt having a head 4 adjacent to the back of the wheel, and a nut 5 on the front of the wheel. The periphery of the hub member has a suitable number of slots or recesses 6 constituting spoke sockets that extend entirely across the periphery of the member. A pair of disks or wheel webs 7 and 8 are provided which preferably are composed of die-pressed metal, the disks being arranged on opposite ends respectively of the hub member and secured by the bolts thereto. The hub member has a suitable bearing box 9 therein which preferably has a flange 10 extending against the disk 8 and directly engaged by the heads 4 of the securing bolts. It will be understood that the box may be provided with any suitable or preferred type of bearing devices to suit the necessary axle of such type as may be preferred.

The disks or webs 7 and 8 have improved radial grooves 11 and 12 respectively in the inner sides thereof, the grooves preferably being formed by pressing out the metal of the disk so as to form imitation spokes 13 and 14 on the outer side of the disks. The grooves correspond in number to the spoke sockets 6. The width of the portion of each groove which is opposite to one end of the socket is equal to the width of the socket and extends inward as far as the bottom of the socket. Each groove has side portions 15 and 16 that extend divergently each to the other from the hub member towards the peripheral portion of the disk or web, the outer end being broader than the inner end of the groove. A suitable number of stud bolts 17 are arranged between the disks and each is provided with relatively small end portions that extend through the disks respectively and have nuts 18 and 19 thereon engaging the outer sides of the disks respectively.

The necessary rim member of the wheel may be variously constructed so as to be provided with such type of tire as may be desired. As preferred, the rim member comprises an inner part 20 composed of metal and having a suitable number of recesses or slots 21 constituting spoke sockets that are equal in width to those in the hub member, which is less than the width of the groove at the rim member. The rim member is received between the disks or webs 7 and 8 and is permitted to slide relatively thereto. The rim member 20 may be of any desired thickness but preferably is thin and provided with an outer part 22 composed of non-metallic material such as wood or vulcanized fiber adapted to deaden sound and having a metallic tire 23 thereon, the latter being broader than the rim member so as to be engaged under unusual circumstances by the outer edges of the disks or webs. In some cases the metallic tire 23 may be suitably adapted to retain a solid rubber tire 24 which may be arranged thereon.

A resilient spring-spoke 25 is provided which is of novel form, each spoke having one end seated in a slot or socket 6 and extending into the grooves 11 and 12 respectively in the wheel webs, the opposite end being seated in a socket or slot 21 in the rim member and extending into the grooves. Each spring-spoke is composed of a coil of spring-steel, but the coil is slightly flattened so as to have straight side portions and curved end portions, the latter being arranged in the grooves of the disks to constitute keys in the grooves whereby to afford driving connections, the arrangement being clearly shown more particularly in Figure 5, the spring-spoke being adapted to extend beyond the side edges of the hub member and the rim member and to have relatively narrow portions in the grooves to enable the sides of the grooves to engage the spoke and thereby drive the rim portion, the disks or webs being rotated or driven by the hub member.

The inner sides of the disks 7 and 8 preferably have annular recesses or packing retainers 26 and 27 respectively in which packing rings 28 and 29 are arranged so as to have contact with the rim member and exclude water and dust from the space between the disks or webs. The recesses preferably are formed by pressing out the metal of the disks so as to form external ribs or beads 30 and 31 respectively.

In practical use, as the wheel rolls on the ground the hub and the disks slightly descend; or in case the rim rolls over a stone or high place in the road, the rim rises and compresses the lowermost spring-spokes with little or no shock or thrust against the hub. The tapering grooves in the disks or webs permit the disks to move upward or downward without interference by the spring-spokes that at the moment may be extended horizontally. In case of fracture of a spring-spoke the disks may descend until their edges are in contact with the metallic tire 23.

Having thus described the invention, what is claimed as new is—

1. A resilient vehicle wheel including a rim member, a hub member, a pair of webs secured to the hub member and slidably engaging opposite sides respectively of the rim member, and a plurality of longitudinally-resilient spokes seated on the hub member and the rim member, each spoke being composed of a flattened coil spring and being laterally engaged by the webs to enable the webs to drive the rim member.

2. A resilient vehicle wheel including an annular rim member, an annular hub member, a plurality of longitudinally-resilient spokes seated directly on the hub member and connected directly with the rim member in keyed arrangement to drive the rim member rotatively, and a pair of webs secured to the hub member and slidably engaging opposite sides of the rim member, the webs having operative connection directly with the spokes to move them circumferentially and enable them to drive the rim member.

3. A resilient vehicle wheel including a rim member having sockets extending across the inner side thereof, a hub member having sockets in the outer side thereof, longitudinally-resilient spokes seated in the sockets in the rim member and the hub member, the spokes having transversely straight sides engaging the sides of the sockets, and a pair of webs secured to the hub member and slidably engaging the rim member, each web having radial grooves in the inner side thereof that extend to the planes of the bottoms of the sockets and close the ends of the sockets in the rim member, the grooves receiving portions of the spokes.

4. In a resilient vehicle wheel, the combination of an annular hub member having socket recesses extending entirely across the periphery thereof, two webs rigidly secured to the hub member and having tapered grooves in the inner sides thereof extending to the opposite ends respectively of the socket recesses, the outer ends being broader than the inner ends of the grooves, each web having an annular packing groove in its inner side arranged between the periphery of the web and the outer ends of the grooves, packing rings in the packing grooves respectively, a rim member movably arranged between the webs and the packing rings and having socket recesses extending entirely across the inner side thereof to the grooves in the webs, stud-bolts between the webs secured thereto, a tire embracing the rim member and extending beyond the opposite sides thereof to permit engagement of the webs therewith, and a plurality of flattened coil springs directly seated in the recesses in the hub member and the rim member and having relatively narrow side portions extending into the grooves in the webs respectively, the springs having transversely straight circumferentially forward and rearward bars engaging the sides of the recesses, each of said bars being longer than the distance between the bars of opposite sides of the spring.

In testimony whereof, I affix my signature in presence of two witnesses.

GEORGE VORDERMARK.

Witnesses:
E. T. SILVIUS,
M. D. STEELE.